United States Patent [19]

Elesh

[11] Patent Number: 5,509,373
[45] Date of Patent: Apr. 23, 1996

[54] PET PERCH FOR ATTACHMENT TO A WINDOW SILL

[75] Inventor: James N. Elesh, Evanston, Ill.

[73] Assignee: Flexi-Mat Corporation, Chicago, Ill.

[21] Appl. No.: 250,549

[22] Filed: May 27, 1994

Related U.S. Application Data

[63] Continuation-in-part of Ser. No. 6,462, Jan. 21, 1993, Pat. No. 5,351,648.

[51] Int. Cl.⁶ ........................................ A01J 1/00
[52] U.S. Cl. ........................................ 119/28.5
[58] Field of Search ...................., 119/15, 19, 28.5; 248/424, 241, 298, 222.4

[56] References Cited

U.S. PATENT DOCUMENTS

| | | | |
|---|---|---|---|
| 1,366,405 | 1/1921 | MacGowan | 119/28.5 X |
| 3,857,365 | 12/1974 | Mueller | 119/28.5 |
| 4,057,081 | 11/1977 | Williams et al. | 119/28.5 |
| 4,869,451 | 9/1989 | Gordon | 248/241 X |
| 4,938,442 | 7/1990 | Mastrodicasa | 248/224 X |
| 5,351,648 | 10/1994 | Elesh | 119/28.5 |

Primary Examiner—Thomas Price
Attorney, Agent, or Firm—Laff, Whitesel, Conte & Saret, Ltd.

[57] ABSTRACT

A pet perch for attachment to a window sill or other support surface has a generally rectangular frame defining a central opening, and a jacket for encasing the frame and covering the opening to provide a soft, hammock-like pet resting area. The jacket may be a drawstring cover which can be attached or removed without disturbing the frame and mounting bracket or removing the perch from the window sill. A pair of adjustable brackets secures the frame to the window sill. Pegs in the brackets are inserted into keyholes in the frame to fasten the frame and brackets together. The holes in the frame provide alternative fastening locations, so that the perch can be used with different depth window sills. In addition, the frame may be secured to the window sill by using hook and loop fasteners on the sill and the frame and/or by using screws or the like.

12 Claims, 5 Drawing Sheets

PET PERCH FOR ATTACHMENT TO A WINDOW SILL

This is a continuation-in-part application to U.S. application Ser. No 08/006,462, filed on Jan. 21, 1993, now U.S. Pat. No. 5,351,648.

The present invention relates to a perch for pets, particularly for cats, to be located adjacent to a window.

BACKGROUND

Domestic cats typically enjoy spending large amounts of time on window sills staring at the outside world. Since window sills tend to be very narrow, however, it is known to construct perches adjacent to the windows to provide additional area for cats to relax while staring outside. The perches usually comprise hard, flat, rectangular surfaces that are covered with carpet or fabric.

Additionally, various means for securing perches to the sills of windows have been developed. For example, one product currently on the market employs a pair of L-shaped brackets that are mounted to the bottom of the perch, and two series of holes formed at the front end of the perch adjacent to the window and on opposite sides of the perch. The free ends of the L-shaped brackets abut the wall underneath the window sill to provide one means of support, and a second means of support is provided in the form of fasteners, which are inserted through one of the holes in each series and anchored to the window sill. The series of holes are employed to provide alternative locations for the fastening of the perch to the window sill because window sills come in different depths (i.e., the distance from the wall to the end of the window sill varies).

Another product on the market uses a single U-shaped bracket mounted to the bottom of the perch near its center, and hook and loop fastening means (i.e., Velcro). One of the legs of the U-shaped bracket is longer than the other and its end abuts the wall underneath the window sill to provide one means of support. The hook and loop fastening means comprises three sets of mating pads that are affixed to the window sill and underneath the perch near its leading edge, providing further means of support.

Although these products are generally adequate and enjoyed by cats, the perches tend to be uncomfortable because they are hard, flat surfaces. Additionally, window sills come in varying size and, depending on the particular window sill, the perches can be difficult to attach because the brackets mounted to the bottom of the perch are not adjustable.

Accordingly, it is an object of this invention to provide a perch for attachment to a window sill, window casement, or other support surface, and which provides a resting surface that is softer and more comfortable for cats than the heretofore known perches.

It is a further object of this invention to provide a perch having adjustable bracket means for easily mounting the perch to the window sill.

It is a still further object of this invention to provide a perch that can be either permanently mounted or releasably mounted to the window sill.

SUMMARY

In accordance with these and other objects, a pet perch for window mounting is provided comprising a frame defining an opening larger in width and length than a typical house cat, and a jacket for encasing the frame and covering the opening to provide a soft, hammock-like effect. In its preferred embodiment, the frame is generally square or rectangular and constructed of a lightweight material, such as plastic, and the jacket is constructed of a soft, lightweight material such as synthetic fleece. The opening is also generally rectangular or square.

Although the perch can be secured adjacent to the window in any suitable manner, in a preferred embodiment, the invention also includes an adjustable means for securing the frame to the window sill, which comprises a pair of U-shaped mounting brackets and two series of first holes extending along opposite sides of the frame. Each of the mounting brackets comprises first and second legs, with the first leg being shorter than the second leg. The end of each second leg is flat and abuts the wall underneath the window sill to support the perch.

Each first leg is fastened to the frame by a series of pegs or the like formed from the first leg. The pegs fit into a series of first holes in the frame. The series of first holes on opposite sides of the perch provide alternative locations for the fastening of the frame to the mounting brackets, so that the perch can be used with window sills having various depths.

Additionally, the jacket fits over the frame and may be secured by a drawstring. This permits the jacket to be easily removed for cleaning. In a preferred embodiment, the ends of the drawstring emerge from the jacket near the window sill.

The securing means may further comprise means for attaching the leading edge of the frame to the window sill. In this embodiment, a ledge is provided that extends substantially along the length of the leading edge of the frame. A plurality of second holes are formed in the ledge and a plurality of fasteners are provided for inserting through the second holes and anchoring to the window sill with the use of a drill or the like. Additionally or alternatively, hook and loop fastening means may be provided on the window sill and the bottom of the ledge to releasably secure the frame to the window sill. Thus, depending on the embodiment of the invention employed, the perch may be either permanently or temporarily mounted to the window sill.

The present invention and advantages thereof will become more apparent upon consideration of the following detailed description when taken in conjunction with the accompanying drawings.

DETAILED DESCRIPTION OF THE PREFERRED EMBODIMENTS

Figure 1:
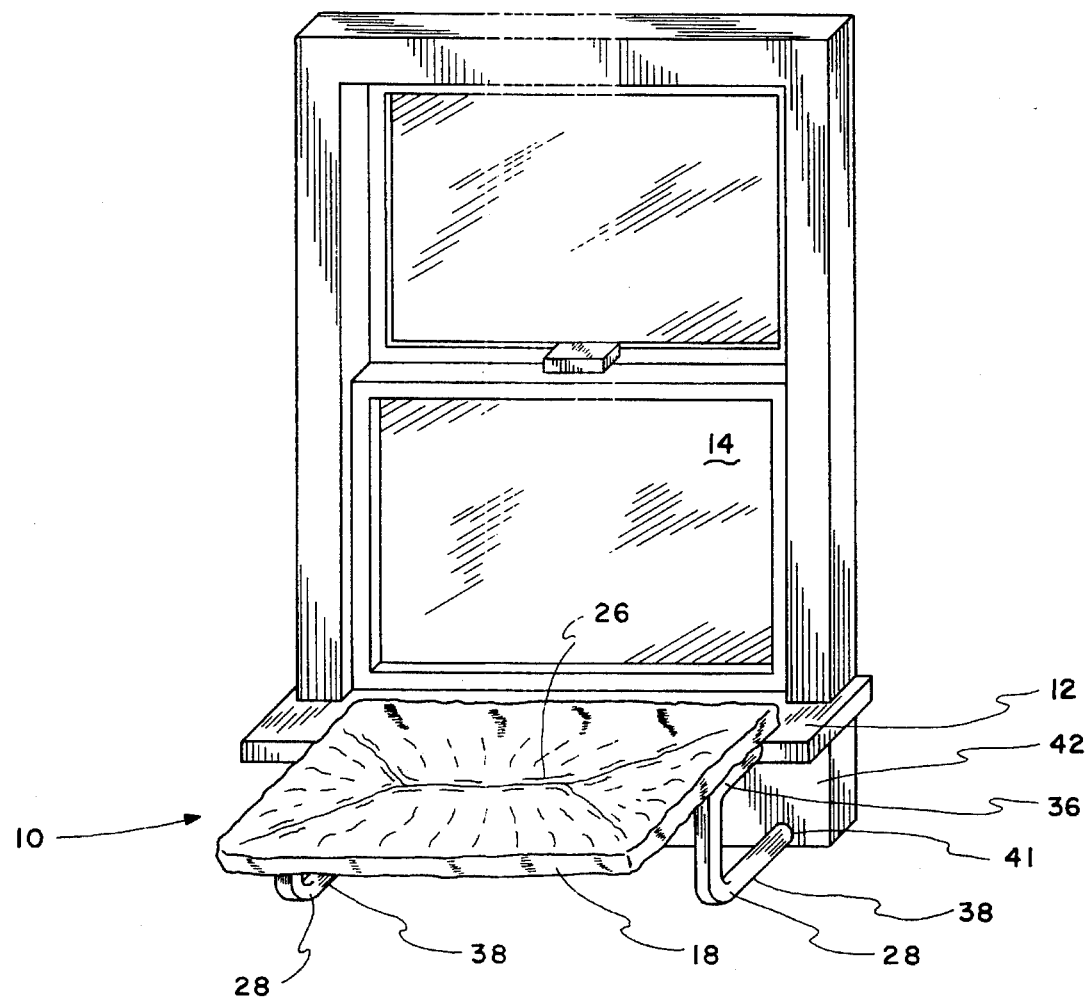
FIG. 1 is a perspective view of a perch in accordance with one embodiment of the invention shown secured to a window sill.
Figure 2:
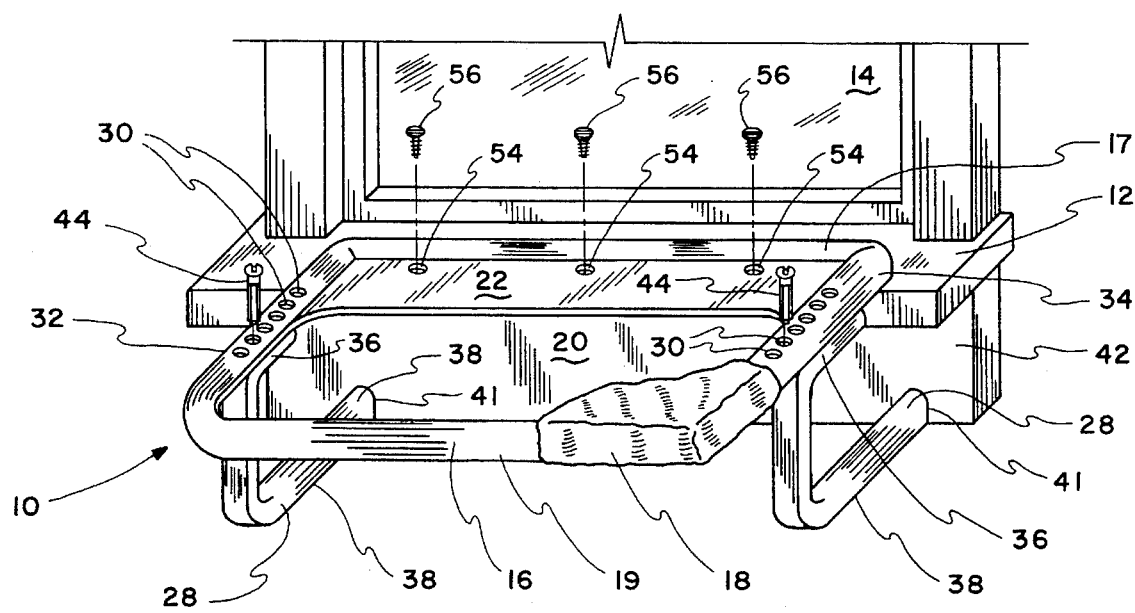
FIG. 2 is a broken and exploded view of the window perch of FIG. 1, illustrating means for securing the perch to the window sill.

A perch 10 in accordance with one embodiment of the invention is shown secured to the sill 12 of a window 14 in FIGS. 1–2. In this embodiment, the perch 10 comprises generally a frame 16 and a jacket 18 encasing the frame. The frame 16 is generally rectangular or square, has a front 17, a back 19, and two opposing sides 32, 34, and defines a relatively large central opening 20 that also is generally rectangular or square (see FIGS. 4 and 5). An elongated rectangular ledge 22 is formed along the front 17 of the frame. The frame 16 is constructed of any material that preferably is lightweight such as plastic. U-shaped channels 24 may be formed on the bottom of the sides 32, 34 frame (FIG. 5), which may reduce the weight and manufacturing costs of the frame.

Figure 6:
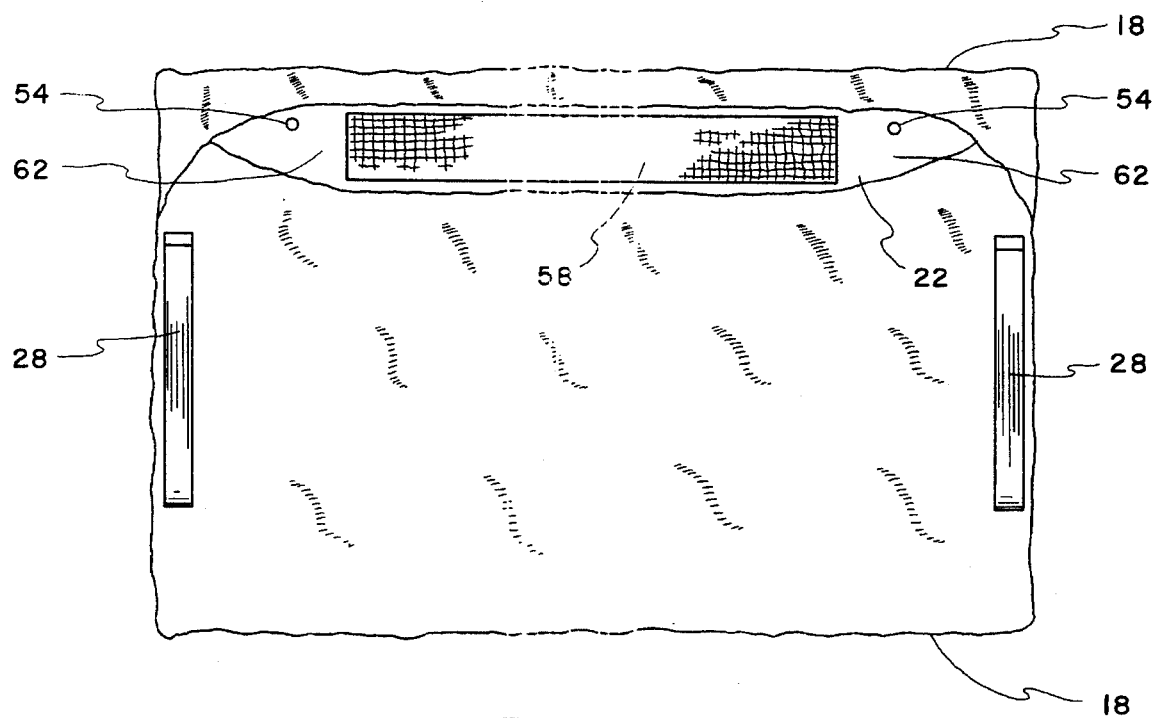
FIG. 6 is a bottom plan view of the frame and jacket of the perch of FIGS. 1–3.

The jacket 18 preferably is constructed of a soft, lightweight, washable material, such as synthetic fleece, and the opening 20 is covered by a portion of the jacket to provide a soft, hammock-like resting area 26 for a cat. As shown in FIG. 1, the resting area 26 over opening 20 sags as a result of the construction, particularly when a cat rests on area 26. As shown best in FIG. 6, the jacket 18 has an envelope construction so that the jacket 18 substantially fully encloses the frame. It is not necessary that a jacket 18 be employed to achieve the hammock-like effect in accordance with the invention; the same effect can be accomplished by covering the opening 20 across either the top or bottom of the frame with a sheet of fabric or other flexible webbing.

Figures 3, 3A:
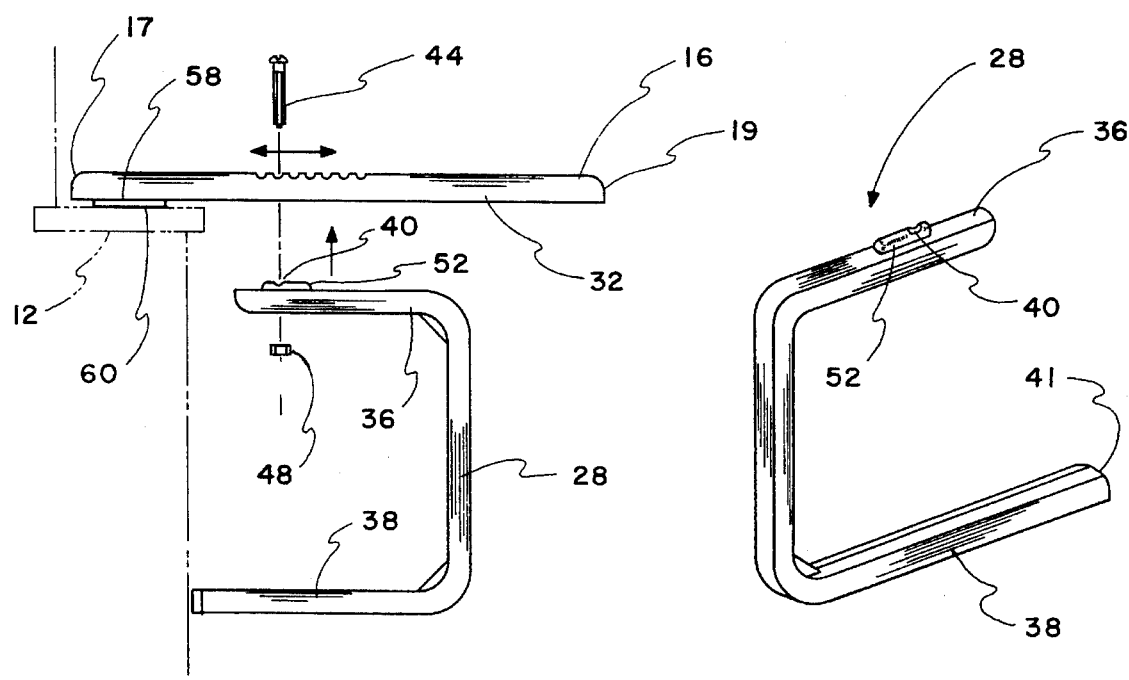
FIG. 3 is a side, exploded view of the frame of the perch of FIG. 2 and one of the adjustable mounting brackets, illustrating adjustable means for securing the brackets to the frame.
FIG. 3A is a perspective view of the mounting bracket shown in FIG. 3.

Although the perch 10 can be secured to the window sill 12 in any suitable manner, in a preferred embodiment, the invention also includes an adjustable means for securing the frame 16 to the window sill 12, which comprises a pair of U-shaped mounting brackets 28 and two series of first holes 30 extending along opposing sides 32, 34 of the frame (see FIGS. 2, 3 and 3A). Each of the mounting brackets 28 comprises first and second legs 36, 38, with the first leg being shorter than the second leg and having an aperture 40. The end 41 of each second leg 38 is flat and abuts the wall 42 underneath the window sill 12 to support the perch 10.

Figure 4:
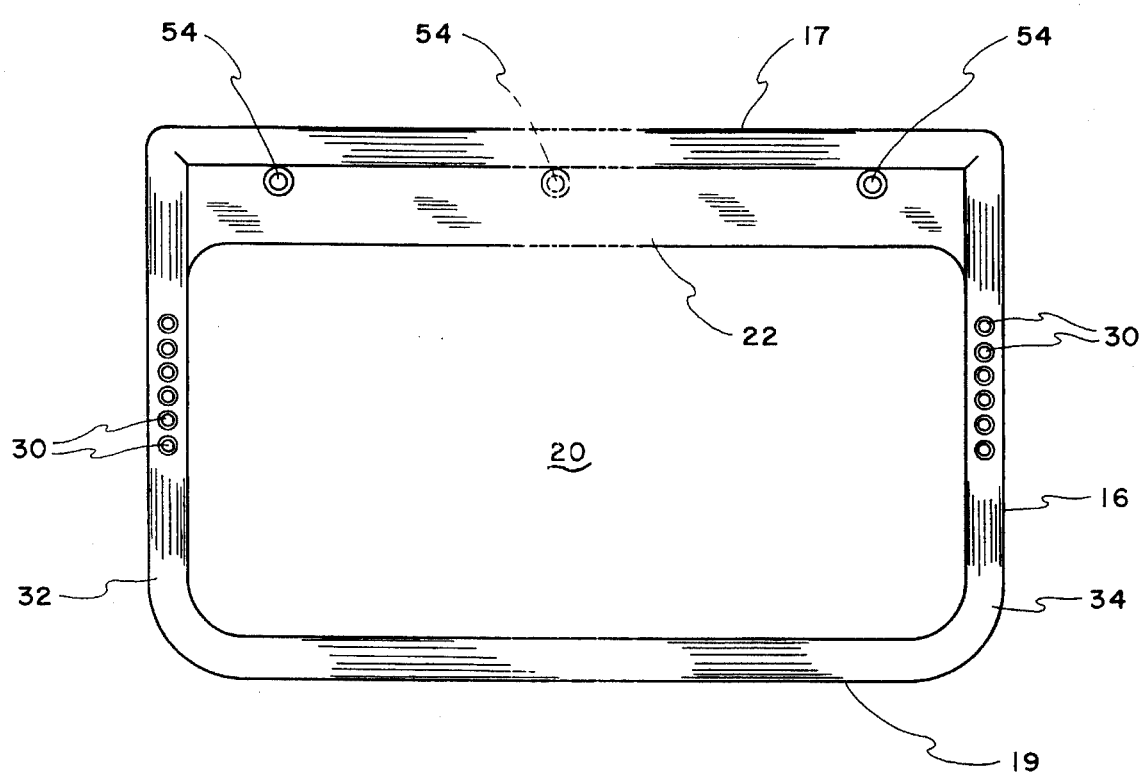
FIG. 4 is a top plan view of the frame of the perch shown in FIGS. 1–3.
Figure 5:
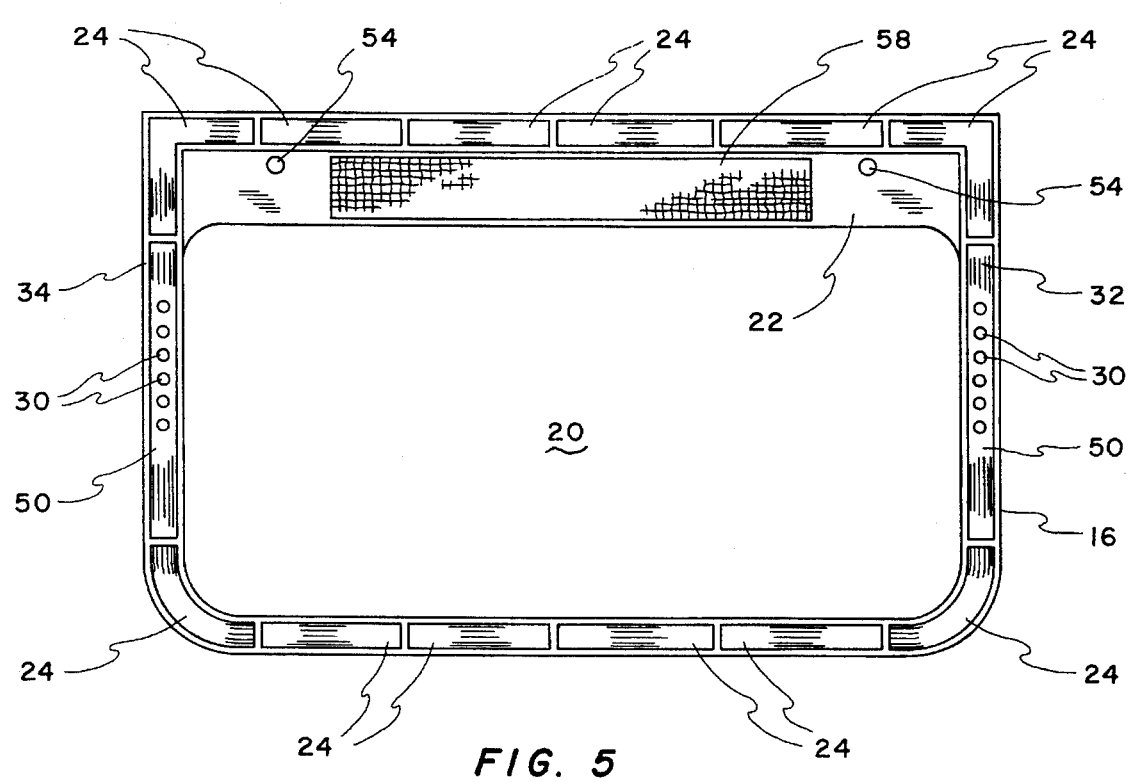
FIG. 5 is a bottom plan view of the frame of FIG. 4.

Each first leg 36 is fastened to the frame 16 by a screw 44 that extends through the aperture 40 and one of the first holes 30, and a nut 48. The screw 44 also punctures the jacket 18, securing it between the frame 16 and the first leg 36. The series of first holes 30 on opposing sides 32, 34 of the perch 10 provide alternative locations for the fastening of the frame 16 to the mounting brackets 28, so that the location of the brackets can be adjusted and the perch 10 can be used with window sills having various depths. If desired, the first holes 30 may be counterbored as shown in FIGS. 2 and 4.

Additionally, a pair of U-shaped channels 50 are formed on the bottom of opposite sides of the frame 16 underneath each series of first holes 30, and an elongated boss 52 is formed on the top side of each first leg 36 around the aperture 40. The shapes of the elongated boss 52 and U-shaped channels 50 formed on the sides of the frame 16 are complementary, so that the bosses are received by and slidingly engage the channels.

The means for securing the frame 16 to the window sill 12 may also include means for attaching the ledge 22 to the window sill 12. The attachment means may comprise a plurality of second holes 54 formed in the ledge 22, and a plurality of fasteners 56 inserted through the second holes and secured to the top of the window sill 12 through the use of a drill or the like. If desired, the second holes 54 may be counterbored as shown in FIGS. 2 and 4.

The attachment means may instead comprise hook and loop fastening means (i.e., Velcro) in the form of a pair of mating pads 58, 60 affixed to the window sill 12 and the bottom of the ledge 22 by any suitable adhesive. The hook and loop fastening means allows the perch 10 to be attached or removed quickly and easily. It is appreciated, however, that the hook and loop fastening means and second holes and fasteners can be used together. Desirably, a gap 62 is formed in the jacket 18 underneath the ledge 22 to accommodate the fasteners and/or one of the hook and loop pads 58, 60 (FIG. 6), and also to allow insertion and removal of the frame 16 when the jacket 18 requires cleaning.

A perch 110 in accordance with another embodiment of the invention is shown in FIGS. 7–11. In this embodiment, the mounting bracket 100 (FIGS. 10–11) is modified from the previous shape. The first leg 102 of bracket 100 has a flat mounting surface 148 which is substantially parallel to the frame and shorter than the second leg 104. The second leg 104 is generally arcuate. The end 106 of each second leg 104 is flat and abuts the wall 108 to further support the perch.

Each first leg 102 is fastened to the frame 112 by flanged pegs 114 extending upwardly from mounting surface 148. Each flanged peg 114 includes a circular head 116 and a cylindrical neck 118 where the diameter of the head is greater than the diameter of the neck.

Figure 7:
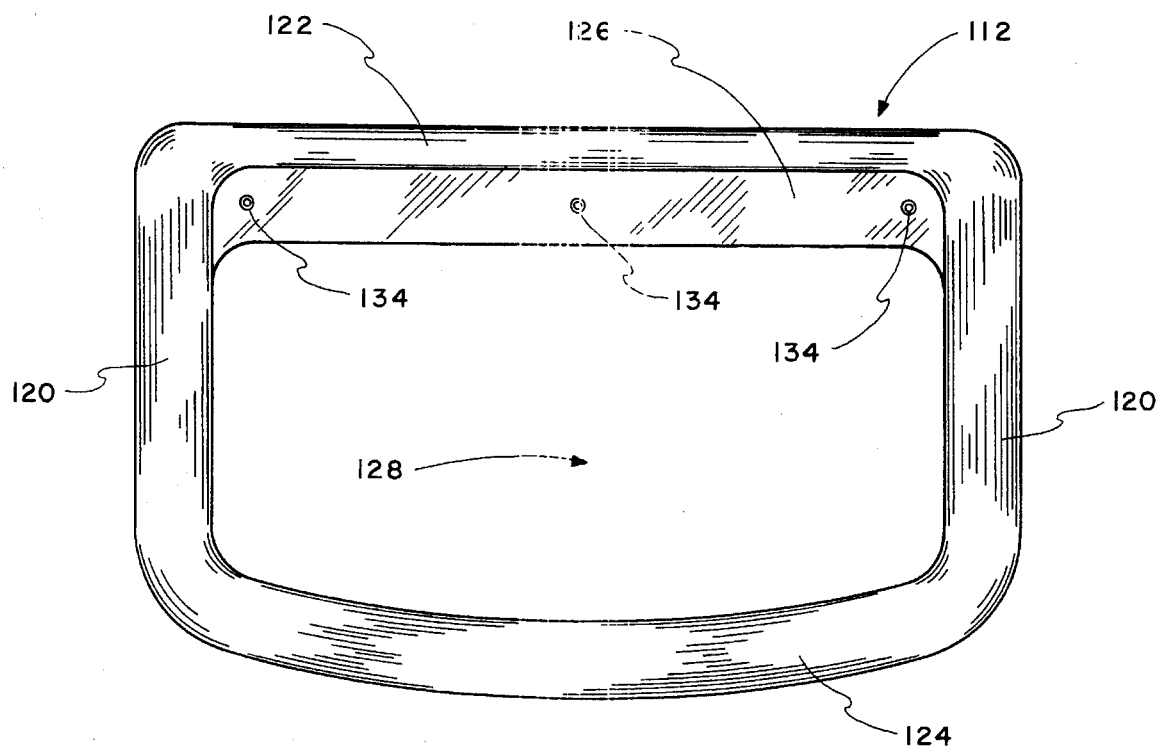
FIG. 7 is a top plan view of the frame, of a second embodiment of the invention.
Figure 8:
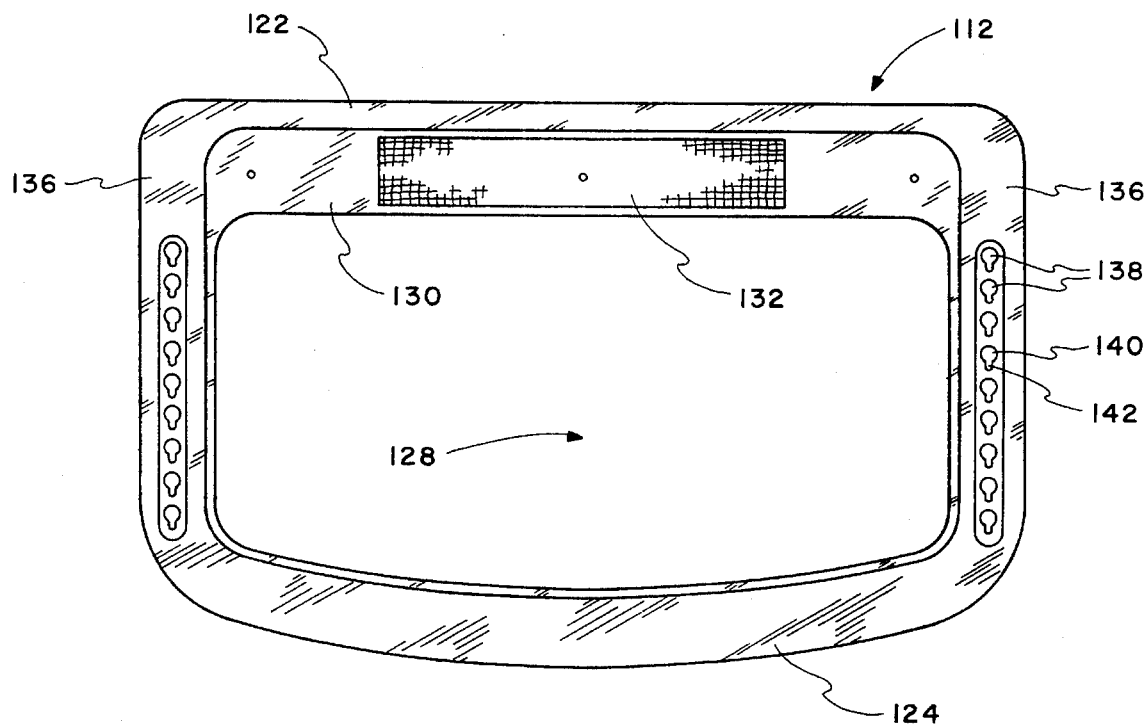
FIG. 8 is a bottom plan view of the frame of FIG. 7.

Frame 112 is also modified. As best shown in FIGS. 7–8, the frame 112 has a pair of parallel side arms 120 joined at their ends by a perpendicularly oriented front section 122 and a slightly bowed back section 124.

An elongated rectangular ledge 126 is formed inwardly from the front section 122. A central opening 128 is defined by the ledge, side arms, and back section. The underside 130 of ledge 126 includes a hook and loop fastening pad 132, with the corresponding pad (not shown) to be placed on the window sill. Ledge 126 also includes holes 134 formed through it, to allow screws or other fasteners to further secure the frame to a window sill, if desired.

The bottom surface 136 of side arms 120 each include a series of linearly aligned keyholes 138. Each keyhole includes an enlarged opening 140 and a slot 142. The enlarged opening 140 is larger than a head 116 of a flanged peg, while the slot 142 is smaller than a head 116 and slightly larger than the diameter of neck 118.

To assemble the legs 102 to frame 112, frame 112 is positioned so that each peg 114 is inserted into an enlarged opening 140. The frame is then slid horizontally in direction A (FIG. 10) so that each head 116 is captured within the frame above slot 142. This design provides a key and keyhole fit for easy assembly and disassembly and further prevents the frame 112 from being inadvertently dislodged when a pet jumps into the perch.

Figure 9:
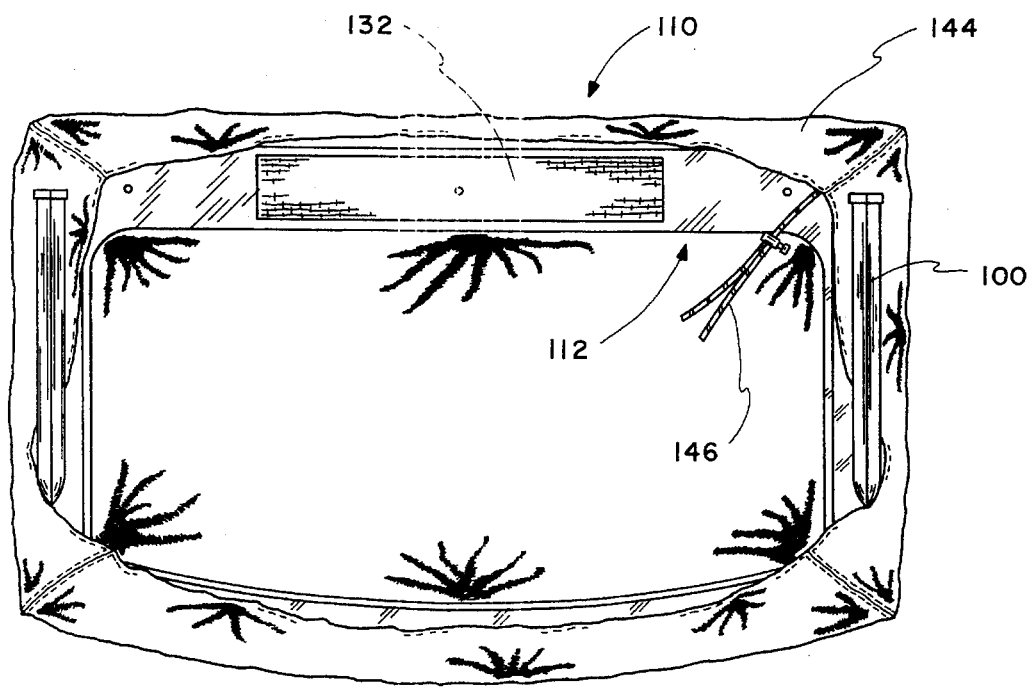
FIG. 9 is a bottom plan view of the frame and jacket of the embodiment of FIGS. 7–8.
Figures 10, 11:
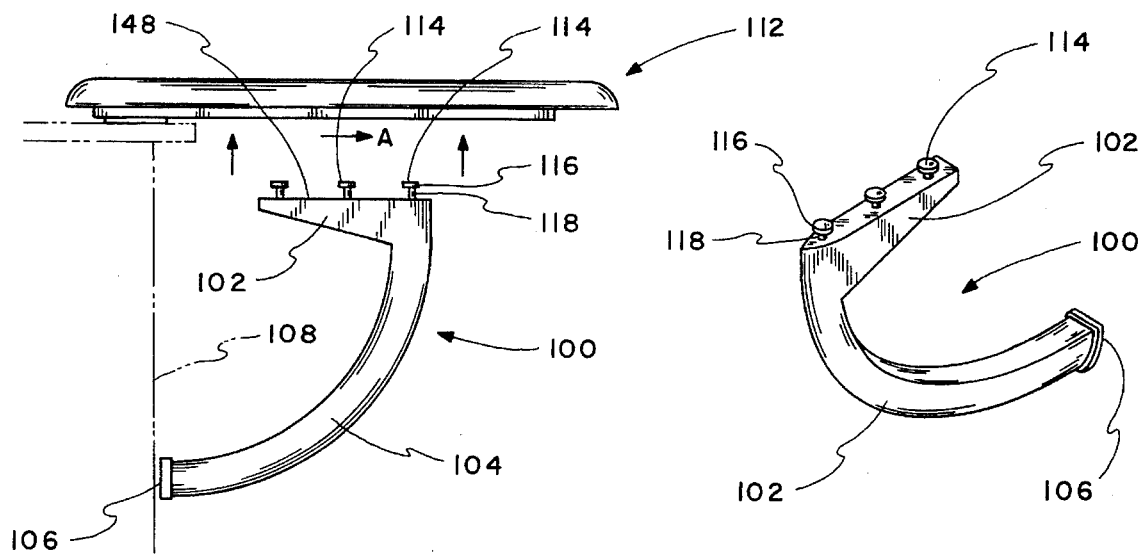
FIG. 10 is a side, exploded view of the frame and a mounting bracket of the second embodiment of the invention.
FIG. 11 is a perspective view of the mounting bracket shown in FIG. 10.

As seen in FIG. 9, the jacket or sheet material 144 is also modified. The jacket covers the central opening 128 and extends over and around the ledge 126 and front section 122, side arms 120, and back section 124. The jacket 144 may be attached to the frame 112 by a drawstring 146, without being secured by screws as seen in the first embodiment. When the jacket 144 is properly positioned, the drawstring 146 extends in a path below the frame 112 that generally conforms to the shape of the frame 112 and around the central opening 128. The drawstring 146 can be pulled and knotted to constrict the jacket 144 snuggly around the frame 112. Preferably, the drawstring may emerge from the jacket 144 so as to be accessible in a corner of the frame 112 near the window sill. Because there are no screws or other fasteners piercing the jacket and thereby securing the jacket to the frame, the jacket can be installed onto or removed from the frame for washing without disassembling the legs or frame.

Once the second embodiment is assembled as described, it is positioned relative to the window sill and wall substantially as shown in FIG. 1.

The foregoing description is for purposes of illustration only and is not intended to limit the scope of protection accorded this invention. The scope of protection is to be measured by the following claims, which should be interpreted as broadly as the inventive contribution permits.

What is claimed is:

1. A pet perch for securing to a support surface, comprising:
   a frame having a bottom surface and holes in said bottom surface, said frame further defining a central opening;
   means for affixing the frame to said support surface;
   securing means engagable with said frame for supporting said frame against said support surface, said securing means comprising at least one mounting bracket, the mounting bracket including means integrally formed thereon for releasably engaging the holes in said bottom surface of the frame at alternate locations for adjustably spacing the perch from the support surface, the mounting bracket terminating in a surface for abutting against the support surface;
   a jacket covering the central opening and at least partially surrounding said frame, the jacket defining a pet resting area; and
   means for removably attaching said jacket to said frame without disassembling said securing means from said frame.

2. The perch of claim 1 wherein said securing means further include a second mounting bracket identical to said first mounting bracket.

3. The perch of claim 1 wherein said attaching means is a drawstring extending substantially around said frame opening.

4. The perch of claim 1 wherein the securing means further comprises hook and loop fastening means, the hook and loop fastening means comprising two mating pads, a first pad being affixed to the frame, and a second pad being affixed to the support surface.

5. The perch of claim 4 wherein a ledge is formed on the frame parallel to the support surface, and wherein the second mating pad is affixed to the ledge.

6. A pet perch for securing to a support surface, comprising:
   a frame defining an opening;
   securing means comprising at least one mounting bracket, the mounting bracket having first and second legs, the first leg being engageable with the frame at alternate locations for adjustably spacing the perch from the support surface, the second leg abutting against the support surface, wherein said mounting bracket includes at least one peg and said frame includes at least one hole for lockably receiving said peg;
   a jacket covering the opening and at least partially surrounding said frame, the jacket defining a pet resting area; and
   means for removably attaching said jacket to said frame without disassembling said securing means from said frame.

7. The perch of claim 6 wherein said at least one peg has a head and neck and the frame hole is keyhole shaped.

8. A pet perch for securing to a support surface, comprising:
   a frame defining an opening;
   securing means comprising at least one mounting bracket, the mounting bracket having first and second legs, the first leg being engageable with the frame at alternate locations for adjustably spacing the perch from the support surface, the second leg abutting against the support surface, wherein said securing means further include a second mounting bracket identical to said first mounting bracket, each of said mounting brackets includes a plurality of pegs extending upwardly from said first legs, and wherein said frame includes a plurality of holes for receiving said pegs;
   a jacket covering the opening and at least partially surrounding said frame, the jacket defining a pet resting area; and
   means for removably attaching said jacket to said frame without disassembling said securing means from said frame.

9. The perch of claim 8 wherein said frame has a front, back, and a pair of opposing side arms, and wherein said holes extend along said side arms.

10. A pet perch for mounting to a window sill and the wall adjoining it, comprising:
    a frame having a front, back, two sides and defining a central opening;
    means for securing the front of the frame to said window sill;
    a fabric sheet substantially encasing a substantial portion of the frame and covering the opening, the fabric sheet defining a pet resting area within the frame; and
    a pair of mounting brackets having pegs extending into said sides of said frame, said sides having holes for lockably receiving said pegs, said mounting brackets abutting against said wall while said frame rests on said window sill.

11. The pet perch of claim 10 wherein said fabric sheet is a removable drawstring cover.

12. The pet perch of claim 10 wherein the frame is secured to the window sill with hook and loop fastening means, the hook and loop fastening means comprising two mating pads, a first pad being affixed to the frame and a second pad being affixed to the window sill.

* * * * *